(12) United States Patent
Hayton et al.

(10) Patent No.: US 9,001,024 B2
(45) Date of Patent: Apr. 7, 2015

(54) ELECTRONIC DOCUMENT READER

(75) Inventors: Carl Hayton, Cambridge (GB); William Reeves, Willingham (GB); Ben Watson, Kings Langley (GB); David Fisher, Hampton (GB)

(73) Assignee: Plastic Logic Limited, Cambridge (GB)

( * ) Notice: Subject to any disclaimer, the term of this patent is extended or adjusted under 35 U.S.C. 154(b) by 763 days.

(21) Appl. No.: 12/267,468

(22) Filed: Nov. 7, 2008

(65) Prior Publication Data

US 2010/0060563 A1 Mar. 11, 2010

(30) Foreign Application Priority Data

Sep. 5, 2008 (GB) .................................. 0816205.9

(51) Int. Cl.
*G09G 3/34* (2006.01)
*G06F 1/18* (2006.01)

(52) U.S. Cl.
CPC ....................................... *G06F 1/181* (2013.01)

(58) Field of Classification Search
USPC ................... 345/76, 156–175; 361/683–687; 428/690, 917; 712/1
See application file for complete search history.

(56) References Cited

U.S. PATENT DOCUMENTS

| | | | |
|---|---|---|---|
| 6,021,306 A | 2/2000 | McTaggart | |
| 6,124,851 A | 9/2000 | Jacobson | |
| 6,577,496 B1 * | 6/2003 | Gioscia et al. ............. | 361/679.3 |
| 6,831,662 B1 | 12/2004 | Lum et al. | |
| 7,388,563 B2 * | 6/2008 | Cheng ............................. | 345/76 |
| 7,706,837 B2 * | 4/2010 | Ladouceur ................. | 455/556.1 |
| 2002/0178343 A1 * | 11/2002 | Tsai et al. .......................... | 712/1 |
| 2003/0214695 A1 * | 11/2003 | Abramson et al. ............ | 359/265 |
| 2004/0061810 A1 * | 4/2004 | Lowery et al. .................. | 349/62 |
| 2004/0201633 A1 | 10/2004 | Barsness et al. | |
| 2005/0098924 A1 * | 5/2005 | Kauppi et al. ............. | 264/328.1 |
| 2005/0151742 A1 | 7/2005 | Hong et al. | |

(Continued)

FOREIGN PATENT DOCUMENTS

| | | |
|---|---|---|
| EP | 0283235 A | 9/1988 |
| EP | 1219401 | 7/2002 |

(Continued)

OTHER PUBLICATIONS

International Search Report for Application No. GB0816205.9 dated Dec. 22, 2008.

(Continued)

*Primary Examiner* — William Boddie
*Assistant Examiner* — Carolyn R Edwards
(74) *Attorney, Agent, or Firm* — Knobbe, Martens, Olson & Bear, LLP

(57) ABSTRACT

We describe an electronic document reading device having a front, display surface and a device rear surface, the device including a connector mounted on an edge of the device. The device includes a back panel having an exterior surface to provide the rear surface and an interior surface, wherein the back panel is substantially transparent and the interior surface of the back panel is substantially opaque, and wherein the back panel has a cut-out for the connector such that a rear surface of the connector is substantially flush with the device rear surface provided by the exterior of the transparent back panel, such that the opaque interior surface of the transparent back panel gives the impression of a device thinner than a physical thickness of the device defined by the substantially flush connector rear surface and the device rear surface.

14 Claims, 5 Drawing Sheets

(56) References Cited

U.S. PATENT DOCUMENTS

| | | | |
|---|---|---|---|
| 2005/0156902 A1* | 7/2005 | McPherson et al. | 345/173 |
| 2005/0260551 A1 | 11/2005 | Rubin et al. | |
| 2005/0270756 A1* | 12/2005 | Kochis et al. | 361/760 |
| 2006/0040081 A1* | 2/2006 | Hodsdon et al. | 428/40.1 |
| 2006/0077190 A1 | 4/2006 | Zhou et al. | |
| 2006/0098395 A1 | 5/2006 | Cheng | |
| 2006/0119615 A1 | 6/2006 | Zhou et al. | |
| 2006/0125802 A1 | 6/2006 | Liang et al. | |
| 2006/0132895 A1* | 6/2006 | Miyazaki | 359/296 |
| 2006/0133664 A1 | 6/2006 | Hong et al. | |
| 2006/0139308 A1 | 6/2006 | Jacobson et al. | |
| 2006/0194619 A1* | 8/2006 | Wilcox et al. | 455/566 |
| 2007/0242057 A1 | 10/2007 | Zadesky | |
| 2008/0048976 A1* | 2/2008 | Rak | 345/157 |
| 2008/0129637 A1* | 6/2008 | Chi et al. | 343/866 |

FOREIGN PATENT DOCUMENTS

| | | |
|---|---|---|
| EP | 1895764 | 3/2008 |
| GB | 2214342 A | 8/1989 |
| GB | 2358598 | 8/2001 |
| GB | 2446302 A | 8/2008 |
| RU | 2224283 C2 | 2/2004 |
| WO | WO 01/47043 | 6/2001 |
| WO | WO 01/47045 | 6/2001 |
| WO | WO 2004/070466 | 8/2004 |
| WO | WO 2006/056808 | 6/2006 |
| WO | WO 2006/059162 | 6/2006 |
| WO | WO 2006/061658 | 6/2006 |
| WO | WO 2006/106365 | 10/2006 |
| WO | WO 2007/012899 A1 | 2/2007 |
| WO | WO 2007/029028 A1 | 3/2007 |
| WO | WO 2007/144549 A1 | 12/2007 |

OTHER PUBLICATIONS

International Search Report for Application No. PCT/GB2009/0151071, dated Feb. 23, 2010.

Office Action from Russian Patent Office for Russian Application No. 2011112854, dated Jun. 17, 2013.

* cited by examiner

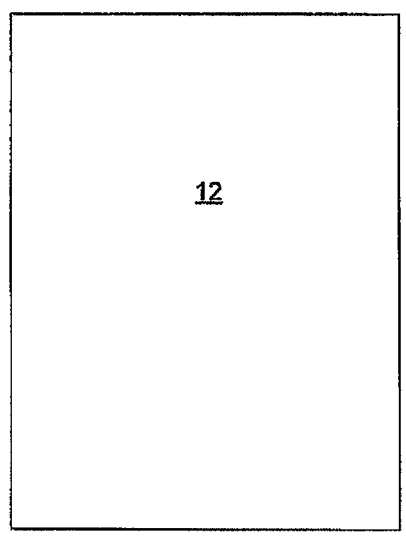
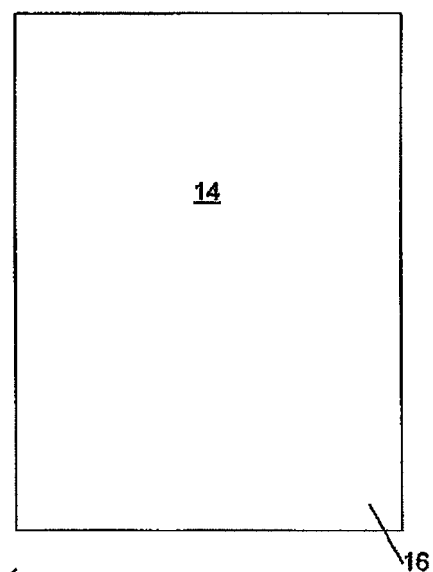
Figure 1a          Figure 1b
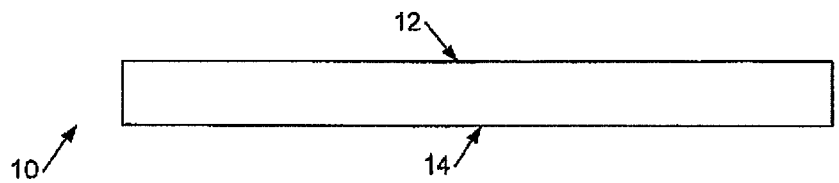
Figure 1c
| 100 | FRONT PANEL | |
|---|---|---|
| 102 | UV AND MOISTURE BARRIER | |
| 104 | ELECTROPHORETIC DISPLAY | |
| 106 | ORGANIC ACTIVE MATRIX PIXEL DRIVER CIRCUITRY | 112 |
| 108 | SUBSTRATE | |
| 110 | MOISTURE BARRIER | |
Figure 2

ELECTRONIC DOCUMENT READER

CROSS-REFERENCE TO RELATED APPLICATIONS

This application claims the benefit of United Kingdom Patent Appl. No. 0816205.9, filed Sep. 5, 2008, which is incorporated in its entirety by reference herein.

BACKGROUND OF THE INVENTION

1. Field of the Invention

This invention generally relates to an electronic document reading device, that is to a device such as an electronic book which presents a document to a user on a display to enable the user to read the document.

2. Description of the Related Art

We have previously described a form of electronic document reading device in U.S. patent application Ser. No. 12/138,748, PCT Appl. No. PCT/GB2006/050235, and United Kingdom Patent Appl. Nos. GB0702347.6 and GB0802805.2, each of which is hereby incorporated in its entirety by reference herein.

Background prior art relating to electronic document reading devices can be found in U.S. Pat. Nos. 6,124,851, 6,124,851, and 6,021,306, and U.S. patent Appl. Publ. Nos. 2004/0201633, 2006/0133664, 2006/0125802, 2006/0139308, 2006/0077190, 2005/0260551, 2005/0151742, and 2006/0119615. Prior art relating to displays can be found in European Patent No. EP0283235A, United Kingdom Patent No. GB2214342A, and U.S. Pat. No. 6,831,662.

SUMMARY OF THE INVENTION

In certain embodiments, an electronic document reading device is provided. The device has a front, display surface and a device rear surface. The device includes a connector mounted on an edge of said device. The device comprises a back panel having an exterior surface to provide said rear surface and an interior surface. The back panel is substantially transparent and the interior surface of the back panel is substantially opaque. The back panel has a cut-out for the connector such that a rear surface of the connector is substantially flush with the device rear surface provided by the exterior of the transparent back panel, such that the opaque interior surface of the transparent back panel gives the impression of a device thinner than a physical thickness of the device defined by the substantially flush connector rear surface and the device rear surface.

In certain embodiments, the above-described technological solution may be employed to provide a physically robust device with improved aesthetics. In certain embodiments, the display is an electrophoretic display, which further facilitates the construction of a thin (front-to-back) device. In certain embodiments, the connector comprises a USB (Universal Serial Bus) connector with a metal housing which defines the rear surface of the connector. The thickness of this metal housing in practice can impose a limitation on the front-to-back thickness of the device, and therefore in certain embodiments, this housing is recessed into the transparent rear panel which is provided with a pigmented (e.g., painted) inner surface which gives the impression that the device is physically thinner than it actually is.

In certain embodiments, the device is substantially planar and the rear panel comprises plastic, i.e., polycarbonate. This enables the device to be a least partially flexible. For example, the device may still operate whilst bent with a radius of less than 50 cm, 40 cm or 30 cm. In certain embodiments, the device has a maximum lateral dimension of at least 10 cm or 15 cm; in certain embodiments, the device has a maximum physical thickness of 10 mm, 8 mm or 5 mm. The rear panel has a thickness in the range 1 mm to 4 mm and a refractive index in the range of 1.4-1.6.

In a related aspect, certain embodiments provide a method of giving a visual appearance to an electronic device of the device being thinner than an actual physical thickness of the device depending on a physical dimension of a component of the device. The method comprises providing the device with a substantially transparent back to fit substantially flush with the component and having an opaque interior surface.

In certain embodiments, an electronic device incorporates means for giving a visual appearance to the device of the device being thinner than an actual physical thickness of the device depending on a physical dimension of a component of the device. The means comprises a substantially transparent back to fit substantially flush with the component and having an opaque interior surface.

In certain embodiments, since organic semi-conductor material and solution deposition technology is employed for fabricating at least the backplane of the device, preferably a UV (ultraviolet) blocking layer or filter is incorporated between a front window of the device and the display, in order to reduce this degradation.

Thus in a further aspect, in certain embodiments, an electronic document reading device is provided. The device comprises an electrophoretic display driven by a backplane comprising a plurality of organic electronic devices. The device further comprises an ultraviolet (UV) filter between a front, display surface of the device through which the display is visible and the backplane comprising the organic electronic devices.

The UV filter may be provided by an adhesive layer within the device, i.e., between the electrophoretic display and the front panel and/or between the organic active matrix pixel driver circuitry and the electrophoretic display. Additionally or alternatively a UV filter may be incorporated in between the front panel and the organic active matrix pixel driver circuitry. In still other embodiments, optionally in addition to the above filters, the front window or front panel of the device may itself provide UV absorption, for example absorbing greater than 50% of incident UVA and/or UVB, preferably greater than 70% of UVA (400-315 nm) and/or greater than 80% absorption of UVB (315-280 nm). In certain embodiments, the front window comprises a plastic material such as PMMA (Polymethacrylate) but in certain embodiments, the front window comprises CR-39 lens material.

BRIEF DESCRIPTION OF THE DRAWINGS

These and other aspects of certain embodiments will now be further described by way of example only, with reference to the accompanying figures in which:

FIGS. 1a to 1c show, respectively, a front, display face view, a rear view, and a vertical cross-section view of an electronic document reading device according to an example embodiment;

FIG. 2 shows a detailed vertical cross-section through a display portion of the device of FIG. 1;

FIG. 4b shows a cross section through the edge of the device for FIG. 4a;

DETAILED DESCRIPTION

Figure 3A:
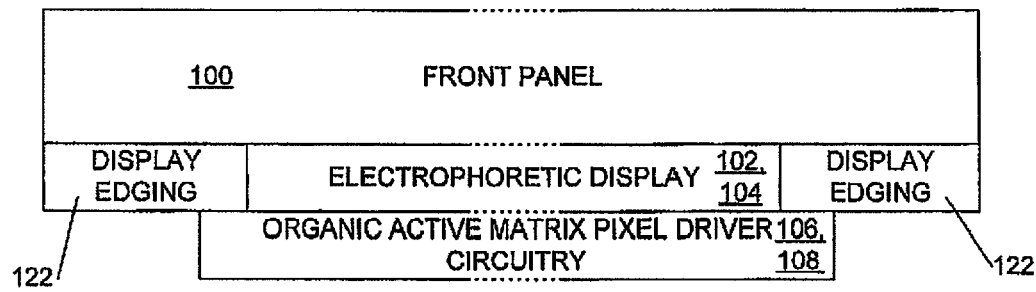
FIGS. 3a and 3b illustrate display edging for the device of FIG. 1.

The electronic reading devices we have previously described employ solution deposition techniques and organic electronic devices which facilitate, inter alia, the fabrication of flexible displays. Even in a substantially planar device, flexibility can confer usability and robustness as compared with, say, a glass LCD panel based device. It is thus generally desirable for a flexible display to be relatively thin, front-to-back; this is also desirable for aesthetic reasons. However to some extent this conflicts with the desire to provide a standard interface to the device, such as USB (Universal Serial Bus) connector, which may dictate a minimum physical thickness.

Referring to FIGS. 1a to 1c, these schematically illustrate an electronic document reading device 10 having a front display face 12 and a rear face 14. As can be seen from FIG. 1c, in certain embodiments, the display surface 12 is substantially flat to the edges of the device and, in particular, lacks a display bezel. However in certain embodiments described below, it will be seen that the electronic (electrophoretic) display does not extend right to the edges of the display surface 12, and rigid control electronics are incorporated around the edges of the electronic display, this approach reducing the overall thickness of the device and thus facilitating flex-tolerance, at the expense of making the overall area of the device slightly larger.

Referring now to FIG. 2, this illustrates a vertical cross-section through a display region of the device between the frame members 16. The drawing is not to scale.

As can be seen, in certain embodiments, the device has a substantially transparent front panel 100, for example made of Perspex (RTM), which acts as a structural member. The active matrix pixel driver circuitry layer 106 may comprise an array of organic or inorganic thin film transistors as disclosed, for example, in WO01/47045. Such a front panel is not necessary and sufficient physical stiffness could be provided, for example, by the substrate 108 optionally in combination with one or both of the moisture barriers 102, 110.

The illustrated example of the structure comprises a substrate 108, typically of plastic such as PET (polyethylene terephthalate) on which is fabricated a thin layer 106 of organic active matrix pixel driver circuitry. Attached over this, for example by adhesive, is an electrophoretic display 104, although alternative display media such as an organic LED display medium or liquid-crystal display medium may also be used. A moisture barrier 102 is provided over the electronic display 104, for example of polyethylene and/or Aclar™, a fluoropolymer (polychlorotrifluoroethylene-PCTFE), which in certain embodiments incorporates an ultraviolet (UV) filter—many suitable UV-filtering plastic materials are available commercially. Additionally or alternatively a UV filtering or blocking layer of adhesive may be included between one more of the layers shown in FIG. 2. A moisture barrier 110 is also provided in certain embodiments under substrate 108; since this moisture barrier does not need to be transparent, in certain embodiments, moisture barrier 110 incorporates a metallic moisture barrier such as a layer of aluminum foil. This allows the moisture barrier to be thinner, hence enhancing overall flexibility.

Approximate example thicknesses for the layers are as follows: 100 µm for moisture barrier 110, 200 µm for substrate 108, 5-6 µm for active layer 106, 190 µm for display 104, and 200 µm for moisture barrier 102. The set of layers 102-110 form an encapsulated electronic display 112; in certain embodiments, this is bonded, for example by adhesive, to a transparent display panel 100. The front panel 100 may have a thickness in the range 0.5-2 mm, for example approximately 1 mm.

Surprisingly it has been found that the presence of the front panel 100 has little effect on the overall visual appearance of the display, in particular the contrast ratio. It is speculated that this is because although whites become slightly greyer, black becomes slightly blacker.

As mentioned above, the active area of the display does not extend to the edge of the display surface, which enables the electronics to control the active display to be placed around the edge of the reading device.

Referring to FIG. 3a, this schematically illustrates a display edging arrangement (the illustration is simplified, and not to scale). As shown the display edging 122 is provided around the perimeter of the electrophoretic display 104. This display edging is coloured to substantially match the colour of the active display area 104, which gives the appearance that the reader is a single display extending to the edges of the reader device. Thus in certain embodiments a boundary between the active display area and a border of the active display area forming margins of a displayed page is at least partially concealed and may be substantially invisible.

In certain embodiments, the display edging may comprise a simple border which may be, for example, sprayed onto the front panel 100. However in other embodiments to provide a uniform appearance to a user display edging 112 may comprise electrophoretic display material such as an additional, undriven sheet of electrophoretic display or an undriven lateral extension of electrophoretic display 104.

Figure 3B:
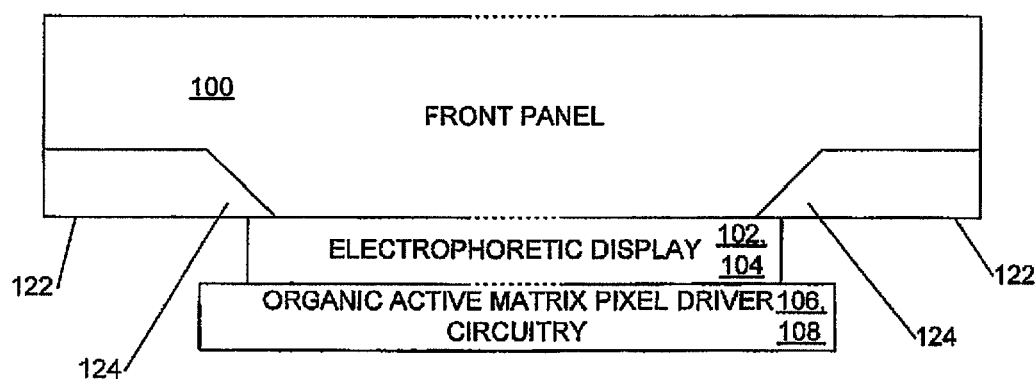

FIG. 3b shows an alternative embodiment of the display, which comprises a display edging 122 that forms part of the front panel 100. Techniques such as dye sublimation are used to embed the transparent front panel with coloured particles. Other techniques for embedding coloured particles into the material of the transparent front panel 100 may be used.

A tapered portion 124 of the embedded particles, where the depth of penetration of the particles into the front panel decreases as the distance from the edge (towards the centre of the device) increases, provides a gradual fade from the display edge to the active display in certain embodiments. Such a taper provides a softer edge between the display edge and the active display, which further helps to create the illusion that the active display extends to the edge of the reading device.

Further, the device of certain embodiments comprises a visual continuation between the border of the device and the display, such that the display is flush to the border of the device. The visual continuation of the two components (the border and the display) is such that the appearance of a material continuation between the two components is also provided.

In certain embodiments, the electronic document reader comprises connectors located along an edge of the device to enable the device to be connected to other electronic devices, such as a laptop or desktop computer, a PDA (Personal Digital Assistant), a mobile phone or 'smart' phone, or other such devices. A USB (universal serial bus) or similar connector is, for example, provided. However, in certain embodiments, the electronic document reader may also be provided with wireless interfaces (for example an infrared or Bluetooth™ or other such interfaces). Such connections enable documents to be transferred to and from the electronic document reader.

The device may also include a number of user controls for selecting documents and/or pages, turning pages forward and back and the like. In certain embodiments, the border around the active display comprises touch sensitive elements. However in other embodiments the display may be touch sensitive, for example as described in our co-pending international patent application PCT/GB2006/050220 hereby incorporated by reference in its entirety. Such sensors may include capacitive sensors or resistive touch sensors. The aforementioned patent application describes an arrangement in which a touch-screen component is positioned below the display, but which is nonetheless operable from the front, display surface, in particular by laminating the display medium and display backplane over a resistive touch-screen (using a pressure sensitive adhesive). However the skilled person will appreciate that other forms of touch-screen technology may additionally or alternatively be employed. In such embodiments, documents may be electronically "marked-up", with mark-up data being written to or being associated with the electronic document being displayed.

Figure 4A:
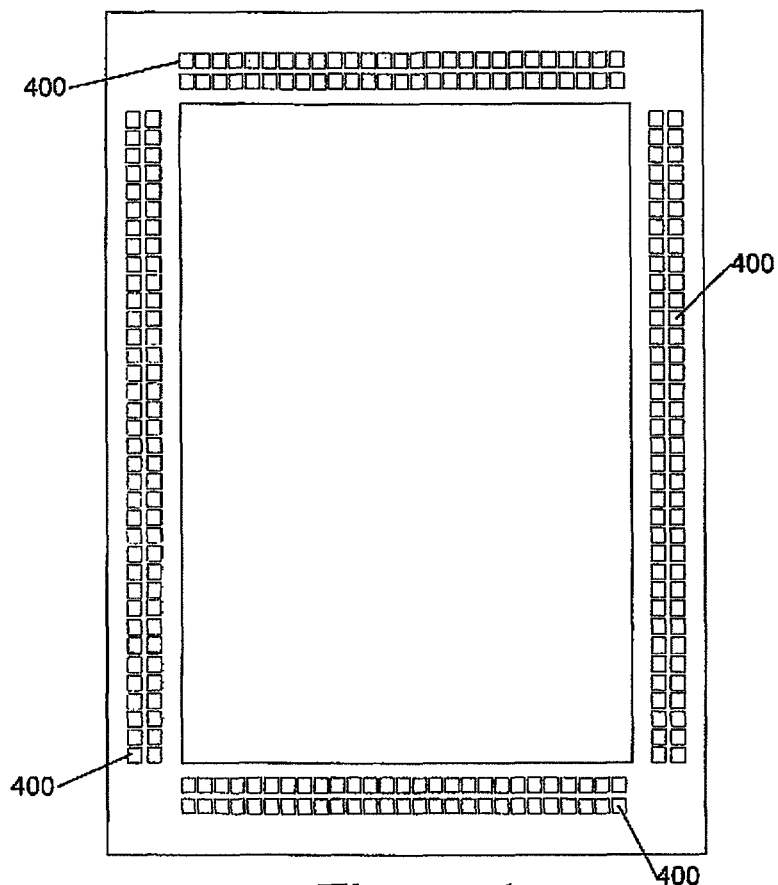
FIG. 4a shows a device having a border comprising touch sensitive elements.

As mentioned above, certain embodiments may have a border comprising touch sensitive elements 400, as shown for example in FIG. 4a. Such elements may provide a number of user controls for selecting documents and/or pages, turning pages forward and back and the like. The touch sensitive elements may be arranged around one or more of the borders of the device. The touch sensors may be arranged such that location agnostic gestures are enabled, wherein a user may perform the same gesture at any point around the border to produce the same result, in particular, independent of orientation (portrait or landscape) of the device.

Figure 4B:
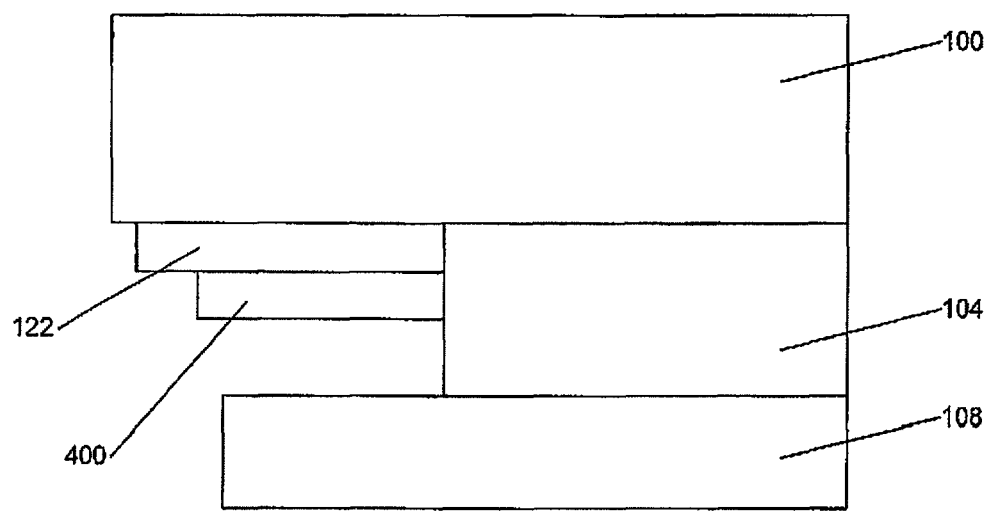

FIG. 4b shows a cross section through the edge of a device. In certain embodiments, to form such touch sensors, a conductive layer 400 of the touch sensor is patterned on the underside of the border 122. The upper conductive layer may be patterned to produce a sensor array, which is formed of a design so as to enable touch sensitive gestures to be provided, both in a horizontal and vertical direction. The upper conductive layer may be a conductive polymer or a metallic layer, such as, but not limited to copper, nickel, gold or silver or alternatively a printable metal. The conductive layer may be deposited using techniques such as vacuum deposition, electroplating and printing techniques, such as screen printing.

An insulator material layer may then be deposited over the upper conductive layer, by techniques such as but not limited to, spray or blade coating or printing techniques. A lower conductive layer may then be deposited over the dielectric layer and patterned, as above. The lower conductive layer forms the ground plane and may also form the tracking plane. Alternatively, a separate conductive layer may be deposited and patterned as above to form the tracking plane, separated from the adjacent conductive layer by a further layer of dielectric material.

Via hole interconnects are formed in certain embodiments between the sensor array and the tracking plane, in order to connect these two layers electrically. The tracking plane is then in turn connected to the electronics of the device.

There are several ways that the connection may be formed between the upper conductive layer and the electronics of the device. Such connections may be formed mechanically, with the aid of an adhesive or through a welding process.

As mentioned above, in certain embodiments the display medium is a reflective display medium, in particular an electrophoretic display medium and the backplane comprises a flexible substrate such as PET or PEN (polyethylene naphthalene). In certain embodiments, the backplane is fabricated using solution-based transistors which can be patterned by techniques such as direct-write printing, laser ablation or photolithography. Further details can be found in the applicant's earlier patent applications, including, in particular, WO 01/47045, WO 2004/070466, WO 01/47043, WO 2006/059162, WO 2006/056808, WO 2006/061658, WO 2006/106365 and PCT/GB2006/050265, all hereby incorporated by reference in their entirety.

Figure 5:
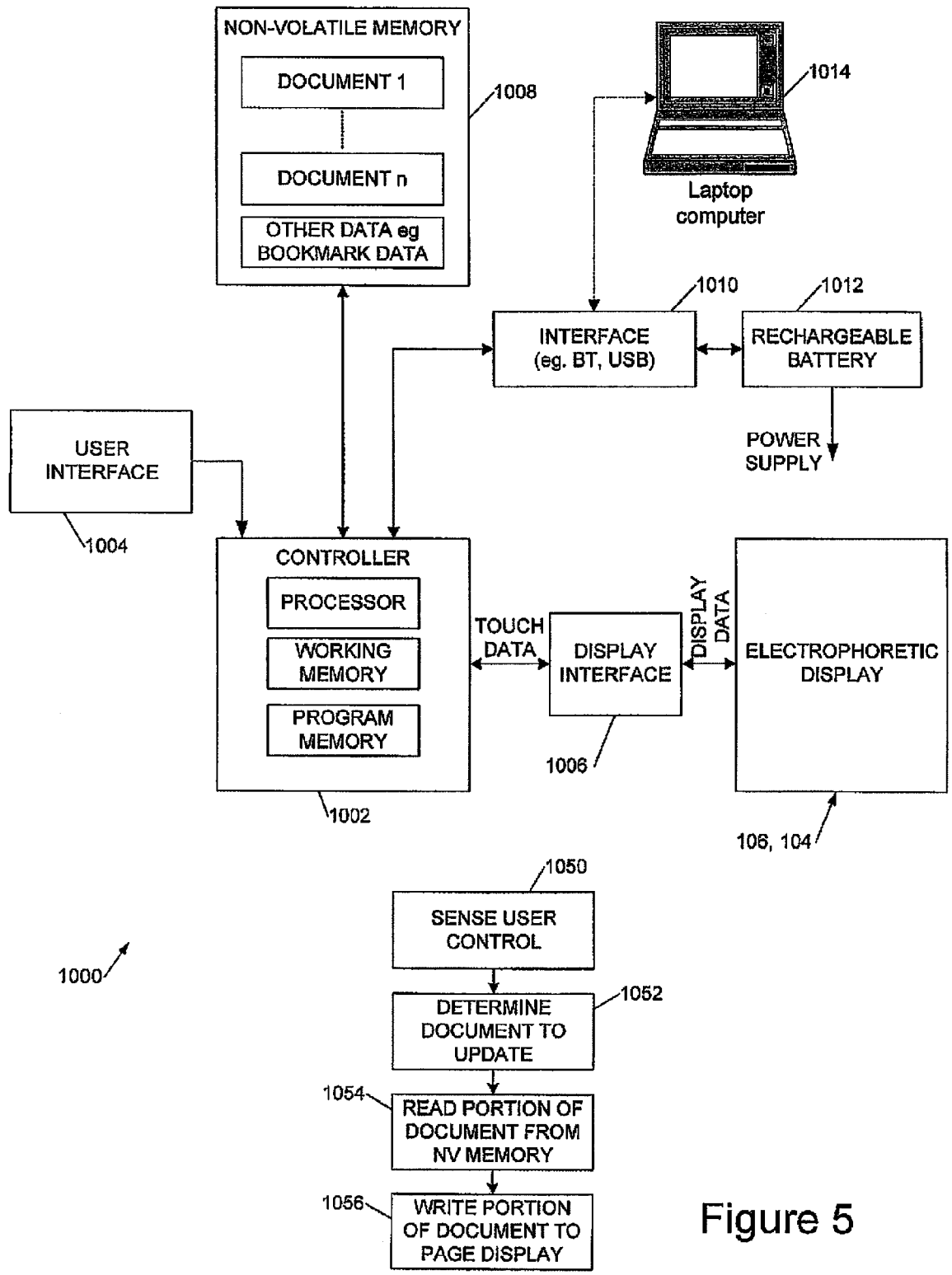
FIG. 5 shows a block diagram of control electronics for an electronic document reader.

Referring now to FIG. 5, this shows example control circuitry 1000 suitable for the above-described electronic document reader 10. The control circuitry comprises a controller 1002 including a processor, working memory and programmed memory, coupled to a user interface 1004 for example for controls 130. The controller is also coupled to the active matrix driver circuitry 106 and electrophoretic display 104 by a display interface 1006 for example provided by integrated circuits 120. In this way controller 1002 is able to send electronic document data to the display 104 and, optionally, to receive touch-sense data from the display. The control electronics also includes non-volatile memory 1008, for example Flash memory for storing data for one or more documents for display and, optionally, other data such as user bookmark locations and the like. An external interface 1010 is provided for interfacing with a computer such as laptop, PDA, or mobile or 'smart' phone 1014 to receive document data and, optionally, to provide data such as user bookmark data. The interface 1010 may comprise a wired, for example USB, and/or wireless, for example Bluetooth™ interface and, optionally, an inductive connection to receive power. The latter feature enables embodiments of the device to entirely dispense with physical electrical connections and hence facilitates inter alia a simpler physical construction and improved device aesthetics as well as greater resistance to moisture. A rechargeable battery 1012 or other rechargeable power source is connected to interface 1010 for recharging, and provides a power supply to the control electronics and display.

The skilled person will appreciate that processor control code for a wide range of functions may be stored in the programmed memory. By way of example a simple document display procedure may comprise, in operation, sensing a user control 1050, determining which document to update 1052, reading a portion of the relevant document from the non-volatile memory 1054, and writing the read portion of the document to the page display 1056.

As discussed above, electronic documents to be displayed on the reader may come from a variety of sources, for example a laptop or desktop computer, a PDA (Personal Digital Assistant), a mobile phone (e.g., Smart Phones such as the Blackberry™), or other such devices. Using the wired (e.g., USB etc.) or wireless (e.g., Bluetooth™) interfaces, the user can transfer such electronic documents to the document reader in a variety of ways. Electronic documents may comprise any number of formats including, but not limited to, PDF, Microsoft Word™, Bitmaps, JPG, TIFF and other known formats.

Figure 6:
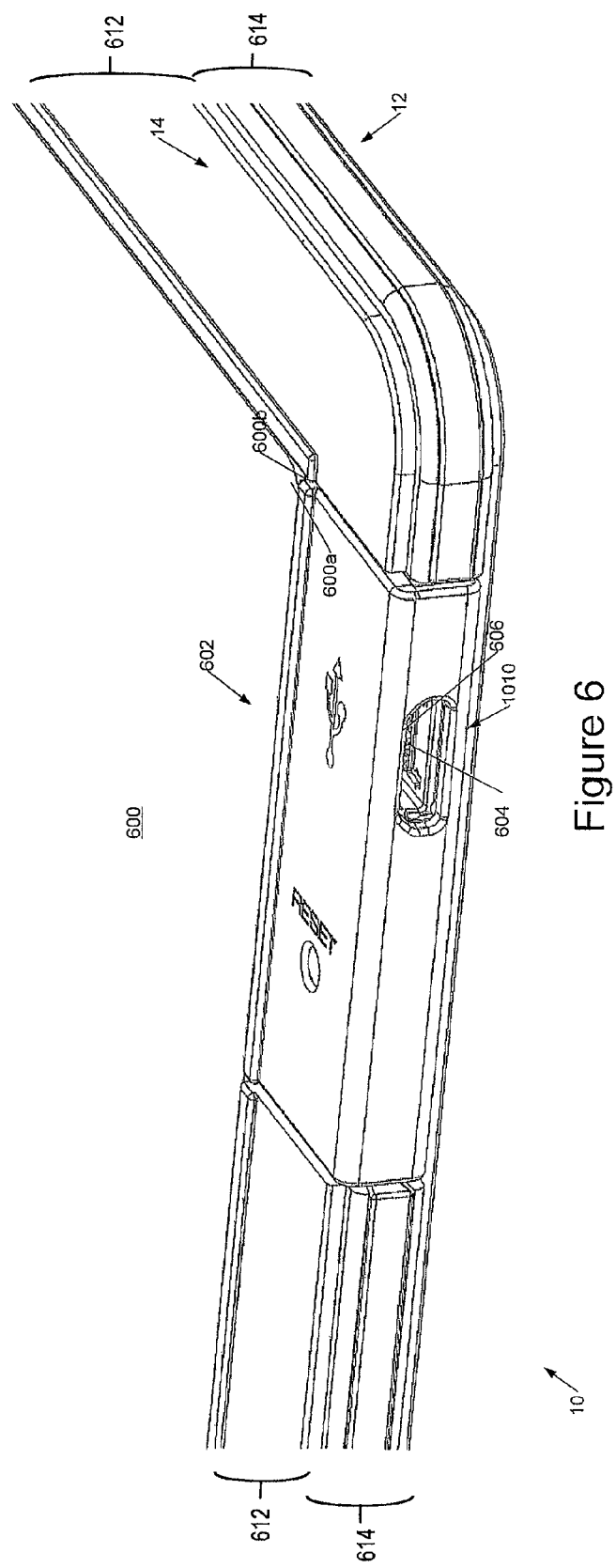
FIG. 6 shows a partial edge view of an electronic document reading device incorporating a transparent rear panel according to an example embodiment.

Referring to FIG. 6, this shows a partial edge view of an embodiment of an electronic document reading device 10, in which like elements to those previously described are indicated by like reference numerals.

As can be seen the rear face 14 of the device is formed by a surface of a polycarbonate rear panel 600 having a recess 602 for an external interface connector 1010. As illustrated the connector comprises a USB connector 604 with a metal housing 606, a rear portion of the housing 606 projecting into recess 602 so that it is substantially flush with the back of the device. The exterior surface 600a of the rear panel 600 is transparent and the interior surface 600b is painted, in this way allowing mechanical support for the USB housing 606 whilst giving a visual impression of a device which is thinner than its actual physical thickness.

The recess in the rear panel may comprise a cut-away portion of a solid rear panel or the recess may be formed by creating a rear panel comprising a central panel with a surround portion (having first surround exterior surface 612 and second surround exterior surface 614) around the outer perimeter of the rear panel. In this latter case the rear panel may comprise two or more pieces which may or may not be joined and the recess in the rear panel may then comprise a missing portion of this surround portion of the rear panel of the device. Thus the reference to a back or rear panel does not imply a continuous back or rear panel—and the illusion of a reduced physical thickness device may be created even when the external perimeter of the rear panel is not substantially transparent. Therefore in certain embodiments, the device appears to be relatively thicker at the edges, that is where a non-transparent rear edging or perimeter portion is employed, and relatively thinner in a central region, preferably forming the majority of the area of the device.

The skilled person will understand that, in this specification, "document" is used broadly since the techniques we describe are applicable to any information on a page, not just words, including for example, pictures, music and in general any material which may be printed to a page. Thus references to pages of a document are to be interpreted broadly and may include, for example, web pages, e-mails, image pages and many other types of document, for example music scores. It will also be understood that certain embodiments of the device we describe may be used for writing as well as reading, for example to annotate a page which is being read.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. An electronic document reading device having a physical thickness defined between a front display surface and an opposing, exterior rear surface of the device which is parallel to the front display surface, the device comprising:
    a back panel having an interior surface and an exterior surface;
    an external interface mounted on an edge of said device, the external interface having a first exterior surface and a second exterior surface, wherein the external interface first exterior surface and the back panel exterior surface are positioned in a same plane and wherein the external interface second exterior surface is transverse to the external interface first exterior surface; and
    a surround portion located around and extending from the outermost perimeter of the back panel, said surround portion having a first surround exterior surface and a second surround exterior surface, the second surround exterior surface being the remainder exterior surface of the surround portion, wherein said first surround exterior surface is opposed to and parallel to said front display surface of the device and wherein said first surround exterior surface has an area greater than an area of the second surround exterior surface, said exterior rear surface of the device comprising said back panel exterior surface and said first surround exterior surface, wherein said back panel exterior surface and said first surround exterior surface are positioned in a same plane,
    wherein said back panel is substantially transparent and said interior surface of said back panel is substantially opaque, and
    wherein the surround portion has a cut-out for said external interface such that the external interface replaces a missing portion of said first surround exterior surface and replaces a missing portion of said second surround exterior surface, the external interface extending from the back panel of the device to the front display surface of the device such that an exterior rear surface of said external interface is substantially flush with said exterior rear surface of the device, wherein said back panel has a thickness substantially equal to a thickness of said external interface and wherein the external interface first exterior surface, positioned in the same plane as the back panel exterior surface, has an area greater than an area of said external interface second exterior surface; and
    wherein said opaque interior surface of said transparent back panel gives the impression that said device is thinner than said physical thickness of said device.

2. An electronic document reading device as claimed in claim 1 comprising an electrophoretic display.

3. An electronic document reading device as claimed in claim 2 wherein said external interface comprises a USB connector.

4. An electronic document reading device as claimed in claim 3 wherein said rear surface of said USB connector is defined by a metal housing of said USB connector.

5. An electronic document reading device as claimed in claim 1 wherein said opaque interior surface of said back panel is pigmented.

6. An electronic document reading device as claimed in claim 1 wherein said transparent back panel is plastic.

7. An electronic document reading device as claimed in claim 1 wherein said device is at least partially flexible in such that whilst in operation the device is able to be bent with a radius of less than 50 cm, 40 cm or 30 cm.

8. An electronic document reading device as claimed in claim 7 wherein said device has a maximum lateral dimension of at least 10 cm or 15 cm, and wherein said device has a maximum physical thickness of 10 mm, 8 mm or 5 mm.

9. An electronic document reading device as claimed in claim 1 wherein a front portion of said device incorporates an ultraviolet filter.

10. An electronic document reading device having a physical thickness defined between a front display face and an opposing, exterior rear face of the device which is parallel to the front display face, the device comprising:
    a substantially transparent back having a recess and an exterior surface;
    an external interface in the recess and having a physical dimension, the external interface mounted on an edge of said device, the external interface having a first exterior surface and a second exterior surface, wherein the external interface first exterior surface and the back exterior surface are positioned in a same plane and wherein the external interface second exterior surface is transverse to the external interface first exterior surface and wherein the external interface first exterior surface, positioned in the same plane as the back exterior surface, has an area greater than an area of said external interface second exterior surface; and
    a surround portion located around and extending from the outermost perimeter of the substantially transparent back, said surround portion having a first surround exterior surface and a second surround exterior surface, the second surround exterior surface being the remainder surface of the surround portion, wherein the first surround exterior surface is opposed to and parallel to said front display face, the surround portion having a cut-out for said external interface such that the external interface replaces a missing portion of said first surround exterior surface and replaces a missing portion of said second surround exterior surface, the external interface extending from the substantially transparent back to the front display face of the device, wherein said exterior rear face of the device comprises said aa exterior surface of said substantially transparent back and said first surround exterior surface, and said recess is in said first surround exterior surface, wherein said exterior surface of said substantially transparent back and said first surround exterior surface are positioned in a same plane, wherein an exterior surface of said external interface is substantially flush with said exterior surface of said substantially transparent back and the first surround exterior surface, wherein said substantially transparent back has a thickness substantially equal to a thickness of said external interface, wherein said substantially transparent back has an opaque interior surface, and wherein said substantially transparent back gives the impression that the device is thinner than said physical thickness of the device.

11. An electronic document reading device according to claim 1, comprising:
an electrophoretic display driven by a backplane comprising a plurality of organic electronic devices;
a plastic front window over said electrophoretic display, said plastic front window comprising a front display surface through which said electrophoretic display is visible;
wherein said plastic front window is configured to provide an ultraviolet (UV) filter,
wherein said ultraviolet filter absorbs at least some of said ultraviolet light incident on said front display surface.

12. An electronic document reading device as claimed in claim 11 wherein said UV filter is at least partially provided by an adhesive layer within said device.

13. An electronic document reading device as claimed in claim 11 wherein said UV filter is at least partially provided by an optical window between said electrophoretic display and said front display surface of said device.

14. An electronic document reading device as claimed in claim 11 wherein said plastic front window absorbs at least 50% of UVB light incident on said front display surface.

* * * * *